Figure 1:
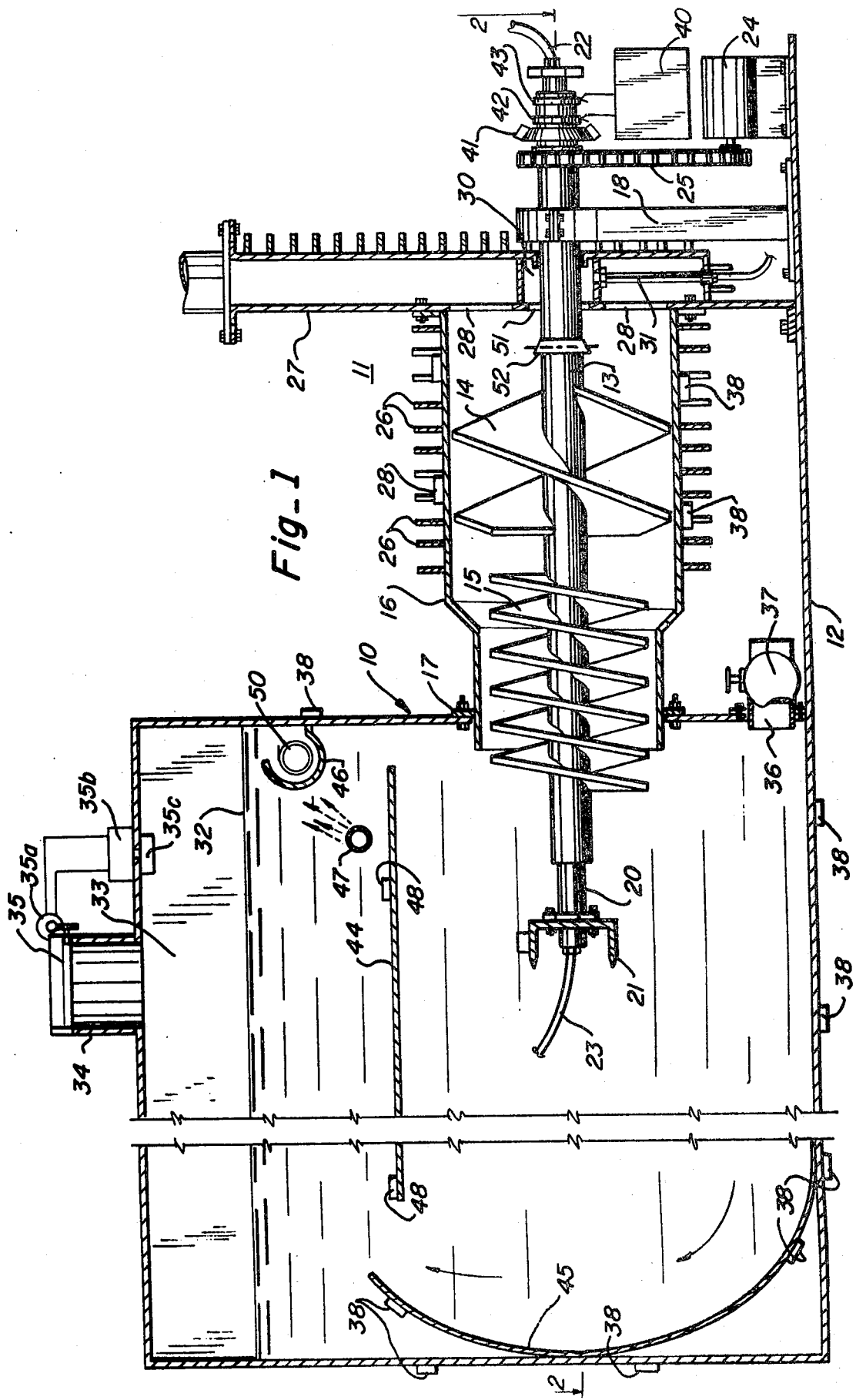

United States Patent [19]

Brown

[11] 3,976,453
[45] Aug. 24, 1976

[54] LIQUID VORTEX VACUUM PUMP

[76] Inventor: Kenard D. Brown, 1227 S. Willow St., Casper, Wyo. 82601

[22] Filed: Aug. 12, 1974

[21] Appl. No.: 496,817

[52] U.S. Cl. .................................. 55/222; 55/223; 55/228; 55/238; 55/247; 55/256; 55/267; 55/292; 55/431; 55/467; 55/417; 210/DIG. 22; 261/28; 261/84; 261/153; 415/72; 415/178; 415/201; 417/71; 417/360

[51] Int. Cl.² ......................................... B01D 47/18

[58] Field of Search .............. 55/223, 226, 228, 235, 55/236, 237, 238, 244, 247, 256, 245, 246, 248, 267, 423, 431, 466, 467, 268, 269, 222, 277, 292, 417; 261/30, 83, 84, 153, 160, 28; 415/60, 72, 110, 201, 178, 119, 121 A; 417/71, 360; 210/DIG. 22; 310/26

[56] References Cited
UNITED STATES PATENTS

| | | | |
|---|---|---|---|
| 919,249 | 4/1909 | Roddiman | 55/431 X |
| 934,617 | 9/1907 | Mockridge | 251/86 |
| 1,614,647 | 1/1927 | Brooks | 55/228 |
| 2,480,095 | 8/1949 | Buchi | 415/110 |
| 2,524,703 | 10/1950 | Hartman | 55/267 X |
| 2,724,505 | 11/1955 | Loosli | 210/DIG. 22 |
| 3,204,861 | 12/1965 | Brown | 417/71 |
| 3,648,440 | 3/1972 | Egan | 55/226 |
| 3,693,326 | 9/1972 | Deane | 55/230 |
| 3,714,764 | 2/1973 | Gething | 55/230 X |
| 3,751,885 | 8/1973 | McNeely | 55/267 |

FOREIGN PATENTS OR APPLICATIONS

| | | | |
|---|---|---|---|
| 378,906 | 8/1920 | Germany | 415/201 |

*Primary Examiner*—Frank W. Lutter
*Assistant Examiner*—David L. Lacey

[57] ABSTRACT

A vacuum pump of the liquid vortex type including a closed tank and a helical rotor for operation below the level of liquid therein is provided with a readily demountable rotor unit mounted exteriorly of the tank and having its enclosing shroud opening into the tank. Servicing, including that for removal of scale is greatly facilitated. In addition the pump is provided with a system of ultrasonic vibration elements whereby the accumulation of scale is inhibited or greatly reduced.

7 Claims, 2 Drawing Figures

Fig_1

LIQUID VORTEX VACUUM PUMP

My invention relates to vacuum pumps of the liquid vortex type and particularly to an improved arrangement for facilitating the servicing and continuous operation of such pumps. This invention is an improvement over the invention of my U.S. Pat. No. 3,812,654 issued May 28, 1974.

The liquid vortex pump has the ability to handle large volumes of gas and to remove undesired constituents therefrom. A vortex pump may be employed, for example, in purifying the combustion gases from power plant furnaces, and when so employed is required to remove sulphurous components of the gases. Sulphur may be removed by treating the fluids with lime and oxygen to produce calcium sulphate or gypsum which, however, forms as a hard scale on the surfaces of the tank and parts of the mechanism. The removal of the scale normally requires a shutdown for servicing and is a slow, time consuming process. It is desirable to minimize the shutdown time required for servicing and accordingly it is an object of my invention to provide a vacuum pump of the liquid vortex type having an improved arrangement for removing and servicing the pump assembly.

It is another object of my invention to provide a gas cleaning system employing a vortex pump for treating combustion gases and the like including an improved arrangement for minimizing the formation of scale on the surfaces within the pump.

It is a further object of my invention to provide a gas cleaning system utilizing a liquid vortex pump and including an improved arrangement for inhibiting the acumulation of scale on the surfaces of the pump.

Briefly, in carrying out the objects of my invention in one embodiment thereof, I provide a vacuum pump of the liquid vortex type in which the tank for holding the main body of liquid has an opening in one side in which an external pump rotor and shroud unit is mounted. The rotor extends partially into the tank and when operating discharges the vortically moving liquid into the tank. I provide piping for returning liquid from the tank to the rotor shroud; control valves are provided to regulate the return flow. The pump may be removed easily for servicing. In order to reduce or inhibit the accumulation of scale on the internal surfaces when the pump is used for the removal of sulphurous and other scale-forming substances for a combustion product stream or the like, I provide ultrasonic transducers for providing vibrations at various locations on the structure and rotor. In this manner shutdown time for scale removal and servicing is greatly reduced.

Figure 2:
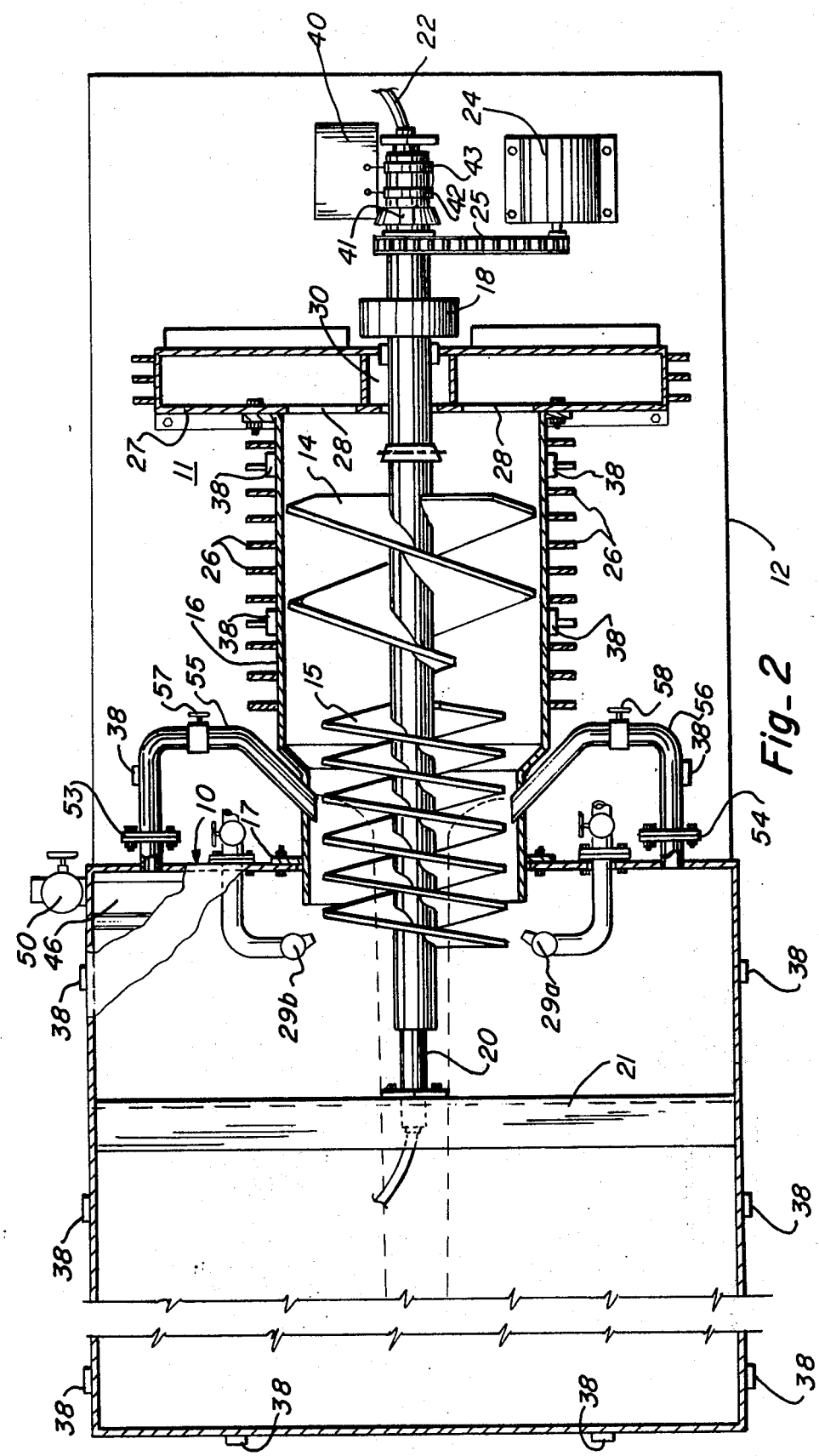

The features of novelty which characterize my invention are set forth in the claims annexed to and forming a part of this specification. My invention itself, however, both as to its organization and manner of operation, together with further objects and advantages, will best be understood by reference to the following description taken in connection with the accompanying drawings in which:

FIG. 1 is a longitudinal sectional view through a liquid vortex vacuum pump embodying my invention; and, FIG. 2 is a plan view generally along the line 2—2 of FIG. 1.

Referring now to the drawings, the liquid vortex pump illustrated comprises a closed tank 10 and a rotating unit 11 mounted on a common base plate 12. The helical rotor unit comprises a two stage rotor mounted on a hollow shaft 13. The rotor includes a first stage or gas compressing helical impeller 14 and a second stage or liquid vortex forming rotor 15. The rotors are housed within a shroud 16 having a larger diameter about the rotor 14 than about the rotor 15. As illustrated, the rotors are of diameters somewhat less than the internal diameter of the shroud. The action of the rotors is that of vortical movement rather than positive displacement. The arrangement of the two stage rotor is essentially the same as that in my above mentioned U.S. Pat. No. 3,812,654. The present arrangement differs from that of my patent in that the pump unit is supported externally of the tank 10, being provided with a flange 17 bolted and sealed to a circular opening in the wall of the tank 10 and which holds the discharge end of the pump just within the tank. The shaft 13 is also supported with a stationary stand 18, a suitable bearing being provided in the upper end of the stand for this purpose. The shaft 13 is mounted on a stationary hollow shaft 20 in the same manner as employed in the pump of my above identified patent. The shaft 20 is supported on a cross beam 21 which is a channel shaped member extending between the sides of the sidewalls of the tank. Lubricating fluid for the bearing system is admitted through a conduit 22 and is discharged through conduit 23 and the shaft 13 is rotated by operation of a motor 24 connected by a chain drive 25 on a sprocket on the shaft. The arrangement of the shroud 16 outside the tank makes it possible to utilize the ambient air for cooling the gases within the shroud and for this purpose a multiplicity of cooling fins 26 are mounted on the portion of the shroud about the intake chamber within which the motor 14 operates. The intake of combustion gases or the like from an incinerator or other apparatus comprises a duct structure 27 which is in communication with the interior of the shroud 16 through a plurality of openings 28. Water or other liquid which may include chemical additives is admitted to a chamber 30 about the shaft and within the duct 27 through a pipe 31 which extends downwardly through the duct 27 to the outside and is connected to the supply of water and additive (not shown). The water in the tank 10 is maintained at a level such as indicated at 32 which provides a gas collecting space 33 above the surface of the liquid. Gas is compressed by the operation of the pump, collected in the space 33 and removed through an outlet 34 under control of a valve 35 which may be adjusted to vary the pressure maintained within the tank. The valve 35 is controlled by operation of a motor 35a in response to a pressure responsive control 35b having a sensor 35c within the tank.

Valve controlled inlets 29a and 29b are provided for introducing air and chemical additions, respectively, for affording further control of the chemical reactions employed for precipatating sulphurous compounds or other undesired substances in the treated gases. Particulate matter and other solids which collect in the bottom of the tank may be flushed out through a duct 36 upon opening of a dump valve 37.

The operation of the system includes the neutralizing of the various chemical substances which may be generated by the burning of the trash and by way of example, sulphurous compounds may be present which produce acids which in turn may be neutralized by the addition of hydrated lime or limewater. This chemical reaction produces calcium sulphide and when additional oxygen is made available forms calcium sulphate or gypsum, which tends to collect on the metal surfaces and form a hard scale. This scale must be removed to maintain efficient operation of the pump and the removal may be a very time consuming job. The apparatus of the type employed for incinerating waste material is normally required to operate on a substantially continuous schedule and any shut-downs are costly and must be avoided if the operation is to be efficient and effective. The arrangement of the pump rotor unit such that it may be detached readily makes it possible to exchange the unit for a new unit while the first unit is serviced. This is one feature of the present invention which facilitates the continued operation of the system. The accumulation of scale on the surfaces of the mechanism interferes with the operation of the unit and prolongs the servicing time. In order to avoid or minimize the accumulation of scale I employ a multiplicity of ultrasonic transducers indicated at 38. The transducers are connected to an ultrasonic energy generator 40 which generates an ultrasonic frequency electrical wave for energizing the transducers. All of the transducers are connected electrically with the generator and are energized accordingly. A suitable transducer such, for example, as a ring type transducer 41 is provided on the hollow shaft 13 adjacent the drive sprocket and is energized from the generator through slip rings 42 and 43. This transducer is arranged to transmit ultrasonic wave energy along the shaft 13 and hence to the helical impellers 14 and 15. It has been found during operation of the system that, probably because of the high velocities and intense energy transfer within the pump, the outer portion of the impellers 14 and 15 remain substantially free from scale. The vibration effected by the transducer 41 decreases or inhibits the formation of scale on the central portion of the rotor and is effective to maintain the rotor in operation over long periods of time without the accumulation of objectionable amounts of scale. Each of the transducers which are located at positions determined during the design of the equipment, and may also be determined by observations during testing, produce vibrations of the metal wall adjacent the transducer and prevent the formation and accumulation of scale thereon. It appears that the vibration of the walls inhibits the accumulation of the scale and that it will also loosen scale should it have collected.

Additional transducers are mounted on a plate 44 extending across the tank between the rotor vortex outlet and the level of the liquid. The liquid circulated within the tank by operation of the pump is turned upwardly and back by a curved baffle 45 which produces a flow of the liquid over the plate 44 and thence toward an open topped trough 46 above the outlet of the shroud and just below the surface of the water. Solid matter within the water may be caused to flow upwardly toward the opening in the trough by discharge of air from a duct 47 extending across the tank below the trough 46 and provided with discharge orifices directed toward the top of the trough. This also makes additional oxygen available for the chemical reactions for precipating undesired components of the treated gas. The arrangement of the transducers on the plate 44, two of which are indicated at 48, transmits ultrasonic energy or shock waves through the water and tends to agglomerate particles of solid matter contained therein. The agglomeration of these particles facilitates their removal by the circulation of the liquid and the directing of the liquid upwardly toward the trough where the solid matter falls into the trough and may be removed upon opening of a valve 50 at the outlet of the trough at the end thereof. In addition, such valves may be provided at both ends and at other positions along the trough to assist in removal of the solid matter collected along the trough. Further, the system may be arranged so that there is a continual circulation of the liquid out of the trough and the accumulation of the solid matter may then be conducted to a separate settling tank or drying equipment such as an ultrasonic distillation chamber.

During the operation of the pump, gas from the duct 27 and water or treating solution directed from the chamber 30 through an annular orifice 51 are mixed, the water being directed from the orifice against a deflector or spinner ring 52 so that the gas and liquid are intimately mixed in the inlet chamber about the helix 14 and are driven with vortical motion by the helix 14 into the liquid vortex which is formed by rotation of the helix 15, the gas and liquid mixture being directed toward the center of the helix about the shaft 13. This facilitates the compressing operation effected within the vortex wherein gas is compressed and various components of the gas are dissolved in the liquid and discharged into the tank. The compression or shrinking of the gas volume within the inlet chamber about the rotor section 14 increases the effectiveness of the pump and the cooling of the gases in the chamber also aids this action. For utilizing the cooling effect of the ambient air the fins 26 are provided on the inlet chamber portion of the shroud 16. Thus the arrangement of the pump outside the tank proper provides additional desirable cooling capacity.

When it is desired to remove the pump 11 the tank is emptied through the dump valve 37 and the bolts attaching the flange 16 to the tank are removed. The support 18 and the bearing at the top of the support are unbolted and removed and the duct assembly 27 is also removed by unbolting it from the flange at the end of the shroud 16. Chain 25 and motor 24 are removed together with the electrical connections to the slip rings 42 and 43 and the oil supply fitting for the conduit 22. All the parts may then be removed, the tube 13 being slidable along the stationary tube 20. In addition, before removing the shroud 16, flanges or couplings 53 and 54 are disconnected to release the water return conduits 55 and 56, respectively. These water return conduits are provided with control valves 57 and 58, respectively, for controlling the return of water from the tank 10 to the shroud 16. This control of the return water is a regulating control which acts in a manner described in my aforesaid patent and in my U.S. Pat. No. 3,204,861 issued Sept. 7, 1965. It will be noted that the return liquid enters the shroud 16 toward the entrance of the reduced portion thereof where it is engaged by the mid-portion of the rotor 15. This position of the return liquid outlets has been found to make possible a more positive and smooth control by adjustment of the valves 57 and 58.

With the pump unit readily removable in the foregoing manner the servicing of the equipment may be effected without having to open the entire tank and lift the unit therefrom.

While I have described my invention in connection with a specific form of the pump unit, various other modifications and applications will occur to those skilled in the art. Therefore I do not desire my invention to be limited to the specific details illustrated and described and I intend by the appended claims to cover all modifications which fall within the spirit and scope of my invention.

I claim:

1. A scrubber for cleaning combustion gases and the like comprising:
   a. a tank filled with a body of liquid to a predetermined level therein and having an opening in a lower side wall portion thereof below said predetermined level of liquid;
   b. a gas and liquid pump of the liquid vortex type mounted on said tank and arranged for discharging vortically mixed gas and liquid through said opening in said lower side wall portion and into said tank below said predetemined level of liquid therein;
   c. said pump comprising a cylindrical shroud arranged outside said tank in open communication with said tank through said opening and having means for detachably securing said shroud to said side wall portion of said tank about said opening and sealing said opening to the wall of said tank, said shroud providing an outside surface for removing heat from said pump, a helical rotor mounted for rotation in said shroud, fluid inlet means for admitting fluids including the combustion gas to said shroud for mixture with the combustion gas remote from said detachable securing means and means for rotating said helical rotor;
   d. means outside said tank and including said detachable means for supporting said pump;
   e. means for removing cleansed gases from said tank; and
   f. means for returning liquid from said tank to the interior of said shroud.

2. A scrubber for cleaning combustion gases and the like as set forth in claim 1 wherein said body of liquid is water and the gas is a combustion product and the fluid admitted to said shroud also includes a treating fluid for mixture with and treatment of the gas, said treatment producing a substance tending to collect as scale on the surfaces of the scrubber structure, and means including ultrasonic wave generators mounted on said scrubber to vibrate said surfaces for inhibiting the accumulation of scale thereon and means for removing scale from said tank.

3. A scrubber for cleaning combustion gases and the like as set forth in claim 2 wherein said rotor includes a shaft extending outside said shroud and said rotor rotating means is outside said shroud, at least one of said ultrasonic wave generators being mounted on said shaft outside said shroud and being electrically excited, and slip ring means for supplying electric energy to said one generator, said generator producing ultrasonic vibrations for inhibiting the accumulation of scale on said rotor.

4. A scrubber for cleaning combustion gases and the like as set forth in claim 1 including a plurality of heat conducting fins on said shroud for utilizing air moving over the fins for removing heat from the fluids in said shroud.

5. A scrubber for cleaning combustion gases as set forth in claim 4 wherein said gas and liquid pump comprises a fluid mixing portion and a liquid vortex portion and said fins are secured to said shroud about said mixing portion.

6. A scrubber for cleaning combustion gases and the like comprising:
   a. a tank filled with a body of liquid to a predetermined level therein and having an opening in a lower side wall portion thereof below said predetermined level of liquid;
   b. a gas and liquid pump of the liquid vortex type mounted on said tank and arranged for discharging vortically mixed gas and liquid through the opening in said lower side wall portion and into said tank below said predetermined level of liquid therein;
   c. said pump comprising a cylindrical shroud arranged outside said tank in open communication with said tank through said opening and having means for detachably securing said shroud to said side wall portion of said tank about said opening and sealing said opening to the wall of said tank a helical rotor mounted for rotation in said shroud, fluid inlet means for admitting fluids including the combustion gas to said shroud for mixture with the combustion gas remote from said detachable securing means and means for rotating said helical rotor;
   d. means outside said tank and including said detachable means for supporting said pump;
   e. means for removing cleansed gases from said tank;
   f. means for returning liquid from said tank to the interior of said shroud, and means for removing solid matter from the liquid in said tank, said removing means including a horizontal open topped trough positioned in the upper portion of said tank below the level of liquid therein, and air discharge means in said tank below said trough and extending therealong for directing air upwardly through the liquid in said tank toward the top of said trough whereby solid matter in the liquid is lifted to the open top of the trough, and means for removing the collected solid matter from said trough.

7. A scrubber for cleaning combustion gases and the like as set forth in claim 6 including means within said tank for producing an upwardly sweeping movement of liquid toward said trough.

* * * * *